United States Patent Office 2,977,817
Patented Apr. 4, 1961

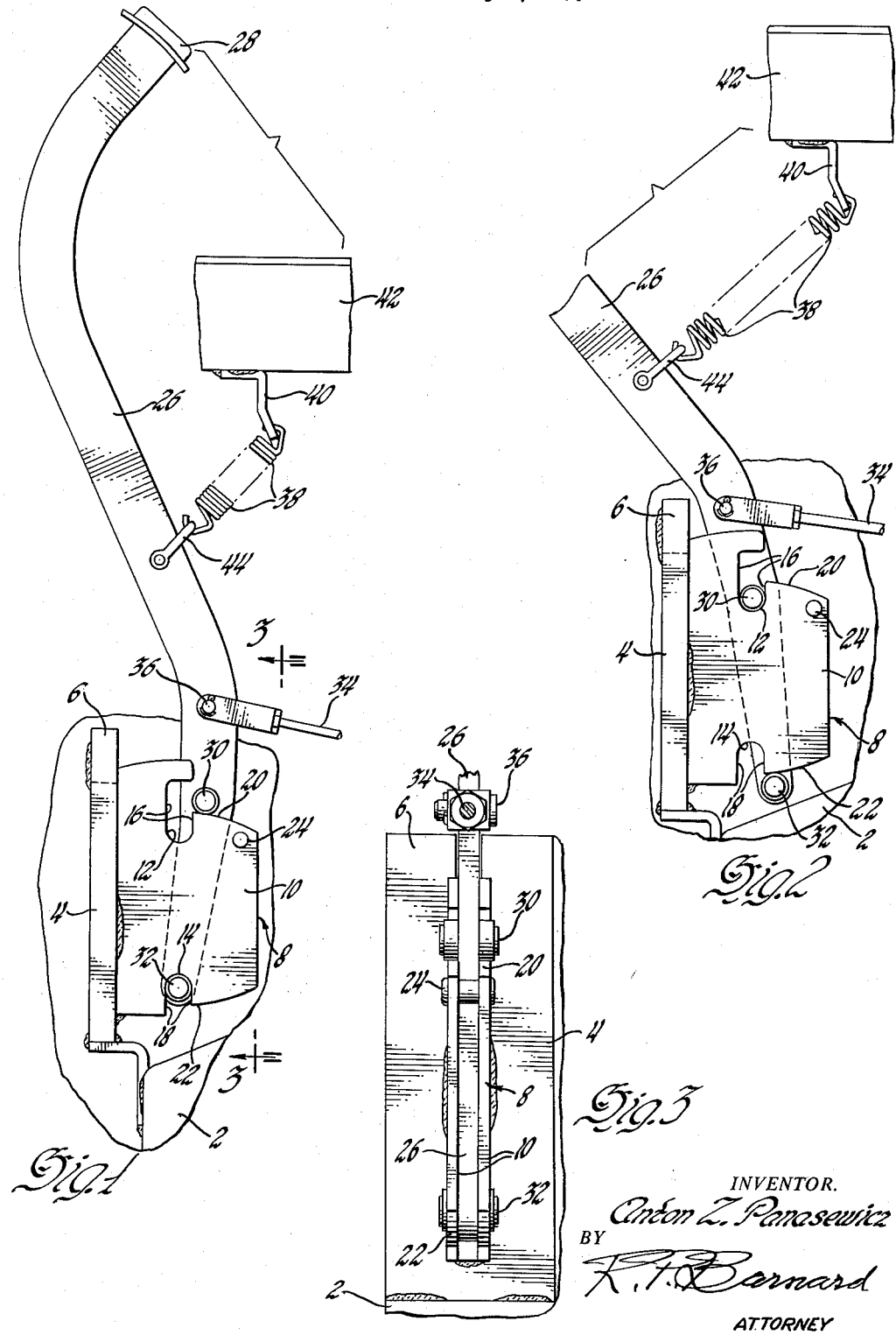

2,977,817

VARIABLE RATIO LEVER MECHANISM

Anton Z. Panasewicz, Parma, Ohio, assignor to General Motors Corporation, Detroit, Mich., a corporation of Delaware Filed July 3, 1958, Ser. No. 746,449

3 Claims. (Cl. 74—516)

This invention relates to variable ratio lever mechanisms and, in particular, to such a lever mechanism adapted to operate clutches, brakes and the like.

Variable ratio lever mechanisms of the type herein contemplated have various and sundry uses all of which are directed to the primary purpose of providing suitable different mechanical advantages in acting on any given load. However, for the purpose of clearly illustrating the present invention while directing attention to a preferred embodiment thereof, the description which follows will be directed to that class of mechanisms typically comprising a pedal-operated lever connected to a suitable mechanical linkage for applying brakes, clutches and the like. However, as the description of the invention proceeds, it will become quite apparent to those acquainted with this art that the lever mechanism of this invention may be quite readily adapted to operate other devices with favorable mechanical advantages.

In lever mechanisms operatively connected as by a mechanical linkage to brakes and clutches, it is quite desirable that the mechanical linkage have as great an initial travel as possible to take up clearance between the braking or clutching member and the member to be braked or clutched prior to locking engagement thereof. Since these members are not being locked during this initial interval of movement, the pedal-operated lever need only provide a relatively low mechanical advantage which results in the aforementioned relatively great initial travel. However, as the members begin to engage, it is desirable that an increased mechanical advantage be provided by the operating lever to firmly lock the members together with relatively little further movement of the lever. Heretofore, the art has lacked a simple solution to the problem of providing favorable and variable lever operating ratios to accommodate the situation aforementioned, and, accordingly, the usual case has been that a compromise has been made between these two advantageous conditions thereby not achieving completely the desirable results of both.

Accordingly, it is a principal object and feature of this invention to provide a variable ratio lever mechanism which is manually operable and adapted to be connected to a load to act on the latter, and which lever mechanism includes means for establishing plural pivot points for the latter at variable distances from the load connection to provide a desired and favorable mechanical advantage during action on the load.

It is yet another object and feature of this invention to provide a variable ratio lever mechanism of the type aforementioned which includes a rigid unitary lever having plural rollers pivotally mounted thereon at spaced points and a lever support having vertically spaced oppositely opening pivot seats respectively associated with the aforementioned rollers, the lever having an initial inactive position in which one of the rollers is yieldably urged into one of the seats, and an active position following limited pivotal movement of the lever in which the one roller is disengaged from its seat and the other roller drops into its associated seat to establish a new mechanical advantage for the lever.

These and other objects and features of this invention will become more apparent hereinafter as the description of the invention proceeds, and in which reference is made to the following drawings in which:

Figure 1 is a fragmentary elevational view of the lever mechanism of this invention shown mounted in an inactive position on a portion of a vehicle structure;

Figure 2 is a view corresponding to Figure 1, but showing the lever mechanism in an active position; and Figure 3 is an enlarged view taken on line 3—3 of Figure 1.

Referring now to the drawings as disclosing an illustrative and preferred embodiment of the invention, like numerals in the various figures of the drawings indicating similar parts, the numeral 2 generally indicates a suitable structural portion of a vehicle, such as a portion of the undercarriage, to which a support bracket 4 may be suitably rigidly secured. The support bracket 4 includes a pair of laterally spaced upstanding projections 6 forming a slot or opening therebetween providing clearance for lever movement as will appear hereinafter. A lever support member 8 includes a pair of identical laterally spaced vertically upstanding plates 10, an edge of which is suitably secured, as by welding, to the rearward face of the support bracket 4. The upper and lower edges of each of the support plates 10 are suitably cut away or relieved to form vertically spaced and aligned upper and lower bearing or pivot seats 12 and 14, respectively, which are substantially semi-cylindrical in shape. Upper and lower vertical wall portions 16 and 18, respectively, on the support plates 10 form openings to the respective bearing seats. The upper and lower edges of each of the support plates 10 are suitably curved to form the upper and lower tracks 20 and 22, respectively. A rigid stop pin 24 extends between and is suitably secured to the plates 10 for a purpose to appear more fully hereinafter.

A rigid unitary lever 26 has a pedal 28 at its upper end, while its lower end extends between the spaced plates 10. Rollers 30 and 32 are pivotally connected to the lever at spaced points thereon, the lower roller 32 being located at the lower end of the lever. The lower roller 32 is adapted to be engaged in the lower pivot seat 14 to form one pivot axis for the lever, while the upper roller 30 is similarly adapted to be engaged in the pivot seat 12 to form a second pivot axis for the lever. The spacing between the rollers 30 and 32 is greater than that of seats 12 and 14 so that they may be progressively seated in their respective pivot seats, but not concurrently. Additionally, the upper and lower tracks 20 and 22 are so designed relative to the spacing between the rollers as not to interfere with pivotal movement of the lever. To this end, the portion of the upper track 20 over which the roller 30 may travel, as will appear hereinafter, has a radius of curvature substantially equal to the distance between the surface of the roller 30 and the pivot axis of the lower roller 32. Similarly, the portion of the lower track 22 over which the lower roller 32 may travel has a radius of curvature substantially equal to the distance from the surface of the lower roller 32 to the pivot axis of the upper roller 30.

A suitable mechanical linkage indicated at 34 has one end suitably pivotally connected at 36 to the lever 26, while the other end may be connected in a well known manner to the movable actuating member of a brake, clutch or other device. One end of a yieldable spring 38 is secured to a bracket 40 suitably mounted to a portion of the vehicle such as the passenger compartment floor 42, while the other end is adapted to be engaged with a bracket 44 or other suitable means pivotally connected to the lever. As will be apparent, the spring 38 continuously urges the lever clockwise and upwardly in Figs. 1 and 2.

In conjunction with a description of the operation of this invention, it may be assumed that the linkage 34 is operatively connected in a manner well known in the art to a braking member such as a disc adapted to be drawn into engagement with a member to be braked. In Fig. 1, the lever mechanism is disclosed in its initial inactive position or a condition of rest in which the spring 38 urges the lever 26 rearwardly until such time as it engages and abuts the stop pin 24. At this time, the lower roller 32 is engaged in its pivot seat 14, while the upper roller 30 is riding on the upper track 20. Assuming that it is now desired to apply the brake, pressure is applied to the pedal 28 resulting in counterclockwise pivotal movement of the lever 26 from the position of Fig. 1 to the position of Fig. 2. Intermediate this range of travel, the lever will pivot about the axis of the lower roller 32, while the upper roller will travel along the upper track 20 until such time as it drops between the walls 16 into the upper pivot seat 12. This range of movement, through suitable adjustment of the mechanical linkage 34, corresponds to the initial travel required to take up slack between the braking members to be engaged. Preferably just before or as such braking engagement begins to occur, the upper roller 30 drops into the upper pivot seat 12, thereby resulting in downward shifting movement of the lever 26 to free the lower roller 32 from its pivot seat. As pressure is continuously applied to the pedal 28, the lever now pivots about the axis of the upper roller 30, while the lower roller 32 travels a short distance along the lower track 22. Continued counterclockwise movement of the lever results in firm engagement of the braking members. When it is desired to release the brake, pressure is relieved on the pedal 28 and the spring 38 pulls upwardly and rearwardly on the lever to extract the upper roller 30 from the upper pivot seat 12 and swing the lower roller 32 clockwise into engagement with the support walls 18 and upwardly into the lower pivot seat 14. As a result, the lever 26 is lifted bodily upwardly and pivoted clockwise to again dispose the mechanism in the position shown in Figure 1.

From the above description, it may be seen that the lever mechanism of this invention provides two very favorable mechanical advantages during its operation. In the first instance, in order to take up slack in the braking members by providing relatively great initial lever movement, a first mechanical advantage is obtained as determined by the ratio of the distance between the point of pressure application at a pedal 28 and the pivot axis of the lower roller 32 to the distance between the pivot axis of the lower roller 32 and the point of connection of a load at 36. A second equally favorable mechanical advantage is obtained to draw the braking members together with relatively small pivotal movement or travel of the lever 26. This second mechanical advantage is determined by the ratio of the distance between the point of application of the pressure on the pedal 28 and the pivot axis of the upper roller 30 to the distance between the latter and the point of connection of the load to the lever at 36. Moreover, from the above description it may be seen that the various parts of the lever mechanism may be suitably positioned relative to each other so as to provide any desired variable ratio lever mechanism. In other words, any other desired multiple ratio system may be provided merely by changing the effective length of the lever 26 and the relative positioning thereon of the rollers 30 and 32 and point of connection 36 of the linkage 34 connected to the load.

Having disclosed a preferred embodiment for the purpose of illustration only, it is to be understood that the invention is not to be limited thereby, but only by the claims which follow.

I claim:

1. A variable ratio lever mechanism comprising a rigid unitary lever having a fixed point thereon adapted to be connected to a load, upper and lower rollers pivotally connected to said lever at points spaced fixed distances from said fixed point of load connection and from each other, a lever support, upper and lower spaced pivot seats on said support, a curved track on said support opening to the upper of said pivot seats, said track having a radius of curvature substantially equal to the distance from the pivot axis of the lower of said rollers to the surface of the upper of said rollers, said lever having a first position in which the lower of said rollers is engaged in the lower of said seats and the upper of said rollers is disposed on said track, said lever being pivotal at one lever ratio about the pivot axis of said lower roller from said first position to a second position in which said upper roller moves into engagement with the upper of said seats to provide a second lever ratio and said lower roller moves out of engagement with said lower seat, and yieldable means connected to said lever urging the latter to said first position.

2. A variable ratio lever mechanism comprising a rigid unitary lever having a fixed point thereon adapted to be connected to a load, upper and lower rollers pivotally connected to said lever at points spaced fixed distances from said fixed point of load connection and from each other, a lever support, upper and lower pivot seats on said support, a first curved track on said support opening to the upper of said pivot seats, said track having a radius of curvature substantially equal to the distance from the pivot axis of the lower of said rollers to the surface of the upper of said rollers, a second curved track on said support opening to the lower of said pivot seats, said second track having a radius of curvature substantially equal to the distance from the pivot axis of the upper of said rollers to the surface of the lower of said rollers, said lever having a first position in which the lower of said rollers is engaged in the lower of said seats and the upper of said rollers is disposed on said first track, said lever being pivotal at one lever ratio about the pivot axis of said lower roller from said first position a second position in which said upper roller moves off of said first track into engagement with the upper of said seats to provide a second lever ratio and said lower roller moves out of engagement with said lower seat onto said second track, and yieldable means connected to said lever urging the latter to said first position.

3. A variable ratio lever mechanism comprising a rigid unitary lever having a fixed point thereon adapted to be connected to a load, upper and lower rollers pivotally connected to said lever at points spaced fixed distances from said fixed point of load connection and from each other, a lever support, upper and lower spaced pivot seats on said support, and a curved track on said support opening to the upper of said seats, said track having a radius of curvature substantially equal to the distance from the pivot axis of the lower of said rollers to the surface of the upper of said rollers, said lever having a first position in which the lower of said rollers is engaged in the lower of said seats and the upper of said rollers is disposed on said track, said lever being pivotal at one lever ratio about the pivot axis of said lower roller from said first position to a second position in which said upper roller moves into engagement with the upper of said seats to provide a second lever ratio and said lower roller moves out of engagement with said lower seat.

(References on following page)

References Cited in the file of this patent

UNITED STATES PATENTS

| | | |
|---|---|---|
| 1,036,916 | Seaman | Aug. 27, 1912 |
| 1,657,738 | Booth | Jan. 31, 1928 |
| 1,951,530 | Richter | Mar. 20, 1934 |
| 2,490,555 | Songer | Dec. 6, 1949 |
| 2,865,220 | Bayley | Dec. 23, 1958 |
| 2,933,942 | Boylan et al. | Apr. 26, 1960 |

FOREIGN PATENTS

| | | |
|---|---|---|
| 716,697 | Germany | Jan. 27, 1942 |

UNITED STATES PATENT OFFICE
CERTIFICATION OF CORRECTION

Patent No. 2,977,817　　　　　　　　　　　　　　　April 4, 1961

Anton Z. Panasewicz

It is hereby certified that error appears in the above numbered patent requiring correction and that the said Letters Patent should read as corrected below.

Column 4, line 46, after "position", first occurrence, insert -- to --.

Signed and sealed this 5th day of September 1961.

(SEAL)
Attest:

ERNEST W. SWIDER　　　　　　　　　　　　　　　DAVID L. LADD
Attesting Officer　　　　　　　　　　　　　　　Commissioner of Patents